(12) United States Patent
Manoharan (10) Patent No.: US 10,164,821 B2
(45) Date of Patent: Dec. 25, 2018

(54) STREAM COMPUTING EVENT MODELS

(71) Applicant: Pivotal Software, Inc., San Francisco, CA (US)

(72) Inventor: Vinesh Prasanna Manoharan, Buckinghamshire (GB)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 15/402,052

(22) Filed: Jan. 9, 2017

(65) Prior Publication Data

US 2017/0126473 A1   May 4, 2017

Related U.S. Application Data

(63) Continuation of application No. 14/317,175, filed on Jun. 27, 2014.

(51) Int. Cl.
*H04L 12/24* (2006.01)
*G06F 9/54* (2006.01)
(Continued)

(52) U.S. Cl.
CPC ............ *H04L 41/065* (2013.01); *G06F 9/542* (2013.01); *H04L 41/0631* (2013.01); *H04L 41/142* (2013.01); *H04L 41/0604* (2013.01); *H04L 41/0654* (2013.01); *H04L 41/16* (2013.01); *H04W 4/14* (2013.01); *H04W 84/12* (2013.01)

(58) Field of Classification Search
None
See application file for complete search history.

(56) References Cited

U.S. PATENT DOCUMENTS

| 2002/0064267 A1* | 5/2002 | Martin | H04M 3/42 |
| | | | 379/201.01 |
| 2006/0020962 A1* | 1/2006 | Stark | G06F 17/30861 |
| | | | 725/32 |

(Continued)

FOREIGN PATENT DOCUMENTS

| WO | WO2012162676 A1 | 11/2012 |
| WO | WO2014019624 A1 | 2/2014 |

OTHER PUBLICATIONS

International Preliminary Report on Patentability in International Application No. PCT/US2015/031711, dated Dec. 27, 2016, 11 pages.

(Continued)

*Primary Examiner* — Tuan C Dao
(74) *Attorney, Agent, or Firm* — Fish & Richardson P.C.

(57) ABSTRACT

Methods, systems, and apparatus, including computer programs encoded on computer storage media, for classifying events in a stream computing system using hierarchical analytic models. One of the methods includes receiving, by a stream computing system, data representing the values of one or more data attributes of an event in a stream of events. The values of each of the one or more data attributes are evaluated according to respective attribute-specific and class-specific criteria of a hierarchical analytic model in a predetermined order defined by the model. When a first value of a first data attribute satisfies one or more particular criteria for a first class, the first class of the plurality of classes is assigned to the event.

12 Claims, 6 Drawing Sheets

(51) Int. Cl.
*H04W 4/14* (2009.01)
*H04W 84/12* (2009.01)

(56) References Cited

U.S. PATENT DOCUMENTS

| | | |
|---|---|---|
| 2006/0036717 A1 | 2/2006 | Backman |
| 2006/0265746 A1 | 11/2006 | Farley |
| 2007/0156916 A1 | 7/2007 | Schiefer |
| 2009/0141634 A1 | 6/2009 | Rothstein |
| 2009/0265379 A1 | 10/2009 | Schiefer |
| 2009/0328070 A1* | 12/2009 | Paknad ............... G06Q 10/06 719/318 |
| 2010/0083101 A1* | 4/2010 | Denoual ............ G06F 17/2247 715/242 |
| 2011/0321020 A1 | 12/2011 | McCabe |
| 2012/0131139 A1* | 5/2012 | Siripurapu ....... G06F 17/30864 709/217 |
| 2012/0310050 A1 | 12/2012 | Osorio |
| 2012/0316916 A1 | 12/2012 | Andrews |
| 2014/0201225 A1 | 7/2014 | Deshmukh |
| 2014/0324530 A1 | 10/2014 | Thompson |

OTHER PUBLICATIONS

International Search Report and Written Opinion in International Application No. PCT/US2015/031711, dated Aug. 13, 2015, 15 pages.
Avvasi, "Avvasi Q-VUE," 2010-2014, retrieved on Oct. 28, 2014 http://www.avvasi.com/products/qvue/.
Delgado and Santiago, "Key Performance Indicators for QoS Assessment in TETRA Networks," International Journal of Mobile Network Communications & Telematics (IJMNCT) vol. 3, No. 6, Dec. 1-18, 2013.
Huawei, "Customer Experience Management," 1998-2014, retrieved on Oct. 28, 2014 http://www.huawei.com/en/solutions/broader-smarter/hw-197861-customerexperiencemanagement.htm.
Kumaran, "Event stream database based architecture to detect network intrusion," Distributed Event-Based Systems, ACM, Jun. 29, 2013, pp. 241-248.
Duyang and Fallah, "A Study of Throughput for Iu-CS and Iu-PS Interface in UMTS Core Network," Dec. 2009, Performance Computing and Communications Conference (IPCCC), 5 pages.
Tektronix Communications, "Touchpoint: Gain full visibility of the end-to-end subscriber experience," 2014, retrieved Oct. 28, 2014, http://www.tekcomms.com/products/touchpoint.

* cited by examiner

STREAM COMPUTING EVENT MODELS

CROSS-REFERENCE TO RELATED APPLICATIONS

This application is a continuation application of and claims priority to U.S. application Ser. No. 14/317,175, filed on Jun. 27, 2014.

BACKGROUND

This specification relates to stream computing.

Stream computing refers to systems and techniques for continually processing unbounded sequences of data objects in real time, i.e., a sequence that is not limited to a predetermined number of data objects or rate of arrival of data objects; such a sequence is referred to as a stream. For example, a stream of objects may represent page requests received by a web site, telemetry events from sensors, or microblog messages posted by users. Stream computing systems can perform a variety of tasks, including providing immediate search results as data objects are found and continually processing new data objects as they are received.

SUMMARY

This specification describes how a stream computing system can use hierarchical analytic models that are suitable for efficiently classifying events in a stream of events representing real-time data of a telecommunications system.

In general, one innovative aspect of the subject matter described in this specification can be embodied in methods that include the actions of receiving, by a stream computing system, data representing the values of one or more data attributes of an event in a stream of events; obtaining a hierarchical analytic model that defines, for a plurality of classes, one or more data attributes of the event to be evaluated by one or more respective attribute-specific and class-specific criteria in a predetermined order; evaluating the values of each of the one or more data attributes according to the respective attribute-specific and class-specific criteria in the predetermined order; determining that a first value of a first data attribute satisfies one or more particular criteria for a first class; and assigning the first class of the plurality of classes to the event. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Evaluating the values of each of the one or more data attributes according to the respective attribute-specific and class-specific criteria in the predetermined order comprises evaluating the values until a first value of a first data attribute of the plurality of data attributes satisfies one or more particular criteria for the first data attribute and the first class. The actions include computing a real-time metric using the first class for the event. The stream is a stream of telecommunications events and the hierarchical analytic model defines attribute-specific criteria for data attributes at multiple levels of a telecommunications protocol stack. The actions include receiving a second event from a second different stream of events; obtaining a second hierarchical analytic model for the second different stream; and assigning a second class of the plurality of classes to the second event according to the second hierarchical model. The actions include computing a cross-stream metric using the first class assigned to the event and the second class assigned to the second event. The plurality of classes includes no more than five classes. The event represents a user sending a short message service (SMS) message through a telecommunications network. The event represents a user making a voice call through a telecommunications network. The stream is an unbounded sequence of events received in real-time.

Particular embodiments of the subject matter described in this specification can be implemented so as to realize one or more of the following advantages. A stream computing system can quickly and efficiently classify events to provide high throughput, low-latency stream processing of large volumes of events. The ability to use stream computing for real-time metrics provides actionable insights in real-time rather than requiring processing data offline. The system can consider event information over multiple layers of a protocol stack. The system can compute cross-stream metrics from multiple different event streams. The analytic models can easily be adapted and changed in real time. The system can detect in real-time information about customer experience, service quality, and opportunities or threats in any online or real-time environment, e.g., in a data communication or telecommunications network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes, among other things, hierarchical analytic models that are designed for high throughput, low-latency processing by a stream computing system. The models can be used to classify data objects, e.g., events, in a stream. In particular, a stream computing system can use the models to compute real-time metrics for streams of telecommunications data.

For the sake of clarity, the analytic models and their uses will be described in the specific context of classifying events in a telecommunications network.

A stream computing system receives data objects that each represent a unit of activity on a telecommunications network, e.g., a user attempting to send a short message service (SMS) message or a user initiating a phone call. In this specification, an event is a data object having one or more data attributes and representing a unit of activity, and an event stream is an unbounded sequence of events received by a stream computing system.

A hierarchical analytic model is hierarchical in that it defines an order in which the values of data attributes of an event are to be evaluated according to one or more respective criteria for each of multiple possible classes. Application of such a model results in a classification of an event into one of the possible classes. The models described in this specification are models designed for low-latency classification of events.

Hierarchical analytic models can be used to compute real-time metrics, which are metrics that are computed from event streams with only minimal appreciable delays to due processing limitations of the system. In other words, the real-time metrics are computed from received events after no or only minimal delays perceivable by a user. Hierarchical analytic models are suited for computing real-time metrics by a stream computing system because events can be classified quickly and efficiently by using such models.

Figure 1:
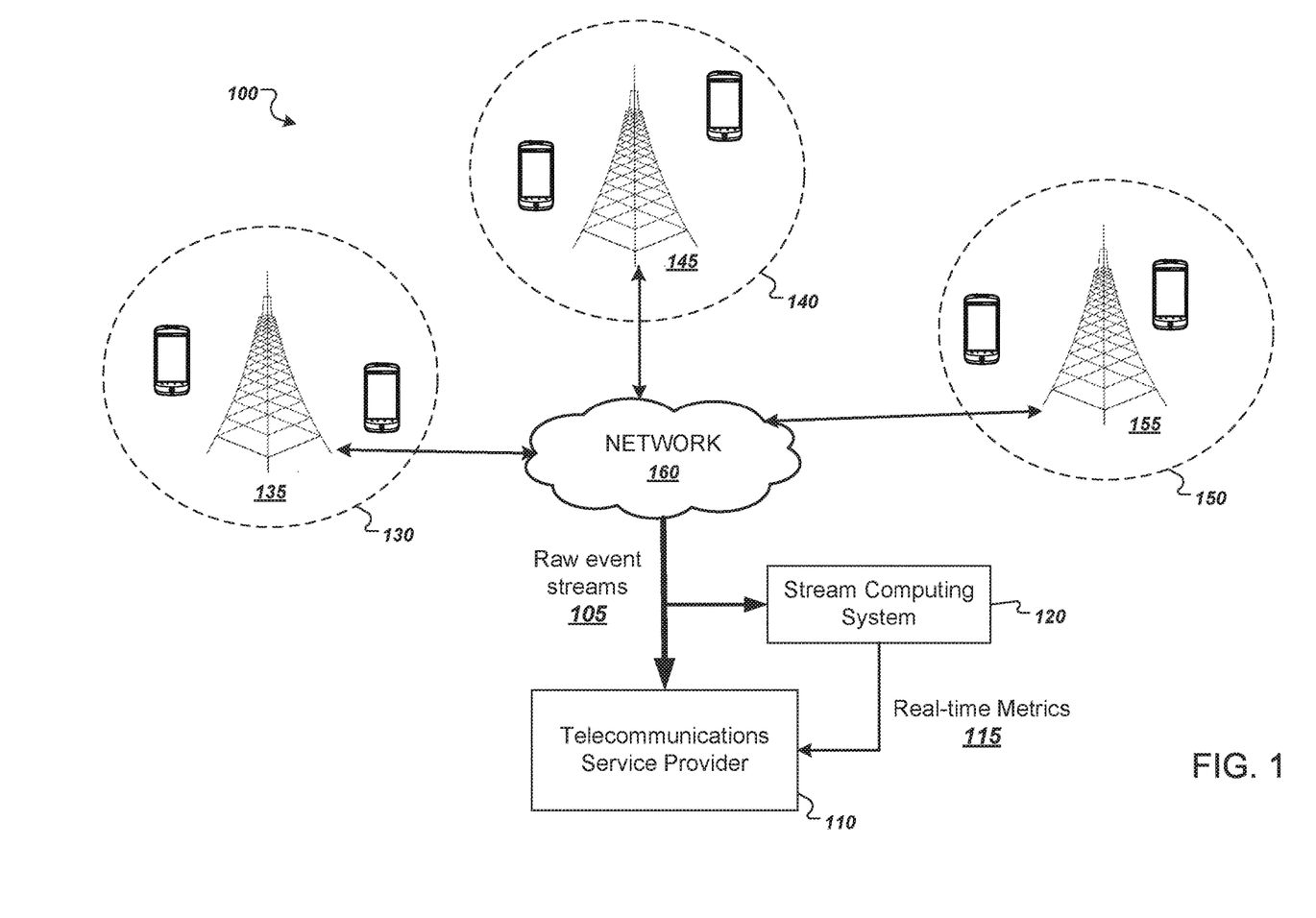
FIG. 1 is a diagram of an example system.

FIG. 1 is a diagram of an example system 100. The system 100 includes a telecommunications service provider 110 in communication with a network 160 of telecommunications elements 135, 145, and 155, e.g., cellular service towers or telemetry sensors. Each of the telecommunications elements 135, 145, and 155 provides telecommunications service to user devices over respective geographic areas 130, 140 150, which are typically partially overlapping.

The telecommunications elements 135, 145, and 155 communicate over, and are part of, the network 160. The network 160 can include, for example, a wireless cellular network, a wireless local area network (WLAN) or Wi-Fi network, a Second Generation (2G), Third Generation (3G), or Fourth Generation (4G) network, or any other appropriate telecommunications network. The network 160 may also include a wired Ethernet network, a private network such as an intranet, a public network such as the Internet, or any appropriate combination of these networks.

Each telecommunications element can provide, to the telecommunications service provider 110, raw event streams 105 of data communications between the user devices communicating over the network 160. The telecommunications provider 110 can take advantage of a stream computing system 120 that computes real-time metrics 115 from the raw event streams 105 as the events are received. To do so, the stream computing system 120 can employ hierarchical analytic models that allow the stream computing system 120 to make efficient and low-latency classifications of events in the raw event streams 105.

Figure 2:
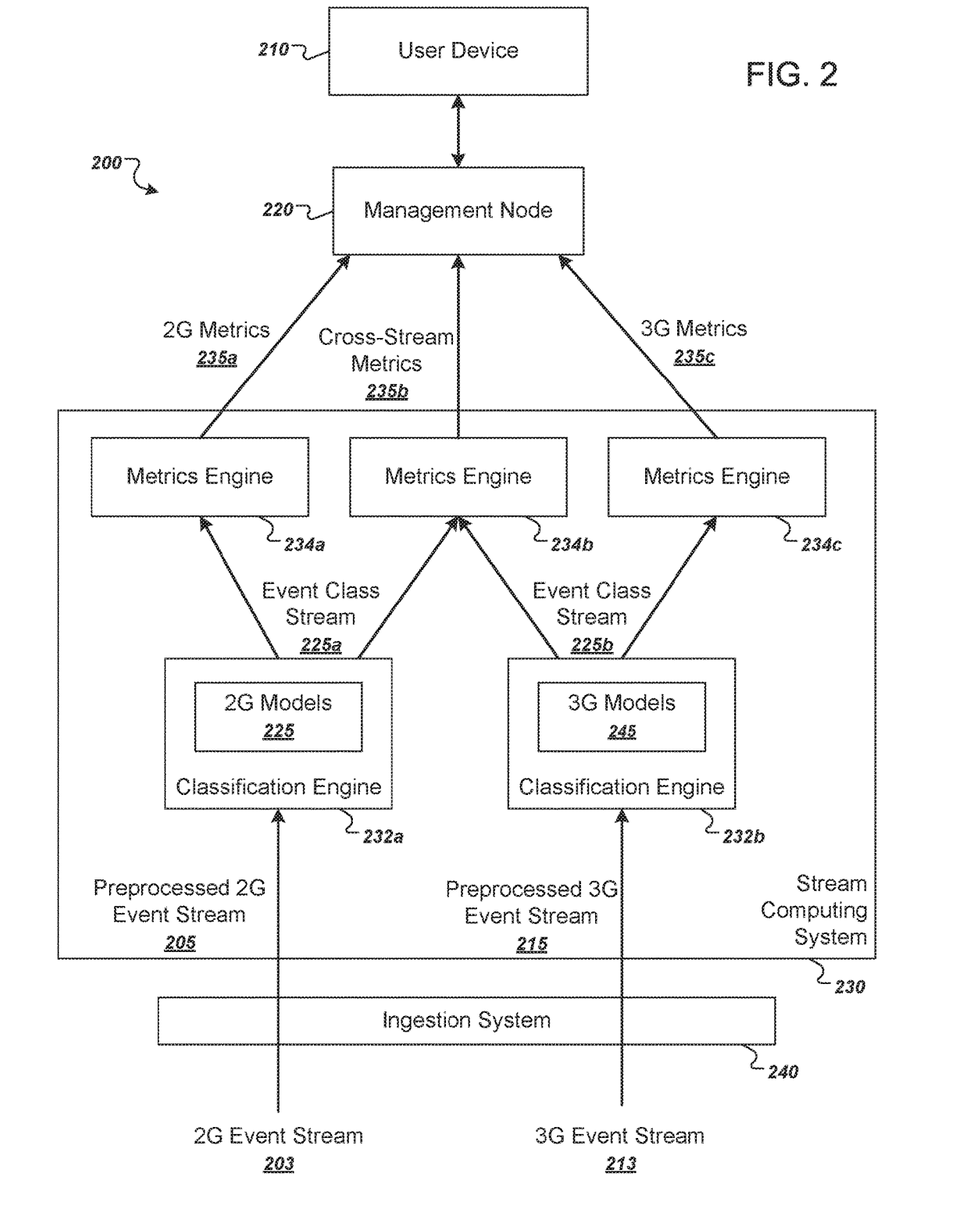
FIG. 2 is a diagram of an example system that includes a stream computing system.

FIG. 2 is a diagram of an example system 200 that includes a stream computing system. The system 200 includes a stream computing system 230 that is configured to provide high throughput, low-latency performance for computing real-time metrics. The system also includes a user device 210, a management node 220, and an ingestion system 240, which are in communication over one or more communications networks, e.g., a local area network or a wide area network, e.g., the Internet.

Each of the user device 210 and the management node 220 can be implemented on one or more computers, e.g., servers, desktop computers, or other stationary or portable devices, that include one or more processors and co/nputor-rcudubln media. The ingestion system 240 can be implemented using one or more computers as part of a telecommunications service provider network or as one or more computing nodes of the stream computing system 230.

The stream computing system 230 is a distributed system of multiple logical computing nodes that implement classification engines 232a and 232b and metrics engines 234a, 234b, and 234c. The multiple logical computing nodes can be implemented as one or more physical computers or as software installed as a virtual machines on one or more physical computers. The stream computing system 230 can have hundreds or thousands of computing nodes, each node implementing one or more metrics engines or classification engines for processing event streams. In some implementations, each physical computing node includes the functionality of all of the logical stream computing nodes, and each physical computing node processes only a portion of the received events.

To reduce processing latency, each component of the stream computing system 230 can have access to high-speed memory designed for fast, random access by a processor, e.g., dynamic random access memory (DRAM). Thus, the stream computing system 230 will generally take steps to improve the probability that data needed to process events is available in memory rather than being stored in nonvolatile storage. For example, the system scale up the number of computing nodes in the system and partition data needed to process the events across the computing nodes so that all of the data fits in the available memory in the system.

The classification engines 232a-b have access to multiple different hierarchical analytic models. The hierarchical analytic models are designed for low-latency classification of events using data from multiple different layers of a telecommunications protocol stack. For example, the models can efficiently classify events using data from the network layer, link layer, and physical layer of a protocol stack. The hierarchical analytic models typically output a small number of classes, e.g., user failure, network failure, or success for each event.

For example, the classification engine 232a uses 2G models 225 for classifying events from a 2G event stream 203. The classification engine 232b uses 3G models 245 for classifying events from a 3G event stream 213.

In operation, an ingestion system 240 receives multiple event streams, e.g., a 2G event stream 203 and a 3G event stream 213. Although only two event streams are shown, the system 200 can operate on any number of appropriate event streams, e.g., it may also operate on a fourth generation (4G) data stream. In some implementations, the system receives separate voice and data streams for each generation of mobile telecommunications technology. In other words, the system may receive streams including a 2G voice stream, a 2G data stream, a 3G voice stream, a 3G data stream, a 4G voice stream, and a 4G data stream.

The ingestion system 240 preprocesses the event streams 203 and 205 for use by the stream computing system 230. In some implementations, the actions of the ingestion system 240 are performed by one or more computing nodes of the stream computing system 230.

For example, the ingestion system 240 can extract relevant segments or data fields of the events, convert the events into a standard form, and anonymize the data. In particular, the ingestion system 240 can transform the events in one or more ways before being stored or used by the stream computing system 230 so that personally identifiable information is removed. For example, an event may be treated so that no personally identifiable information can be determined from the event, or a geographic location associated with the event may be generalized so that a precise location of a user cannot be determined.

The stream computing system 230 receives the preprocessed event streams, e.g., preprocessed 2G event stream 205 and the preprocessed 3G event stream 213. Each classification engine uses its hierarchical analytic models to classify events and output an event class stream, e.g., an event class stream 225a and an event class stream 225b.

The metrics engines 234a-c receive the event class streams 225a-b and compute real-time metrics, e.g., 2G metrics 235a and 3G metrics 235c. Some metrics engines may compute metrics from multiple different event class streams. For example, the metrics engine 234b receives the event class stream 225a and the event class stream 225b and computes cross-stream metrics 235b.

The metrics engines 234a-c provide their respective real-time metrics 235a-c to a management node 220 for analysis. For example, the management node 220 can aggregate and the real-time metrics and generate real-time notifications regarding problems, opportunities, or threats in the network.

A user of the user device 210 can interact with the management node 220 to receive the real-time notifications generated by the management node 220 or the real-time metrics computed by the stream computing system 230.

Figure 3:
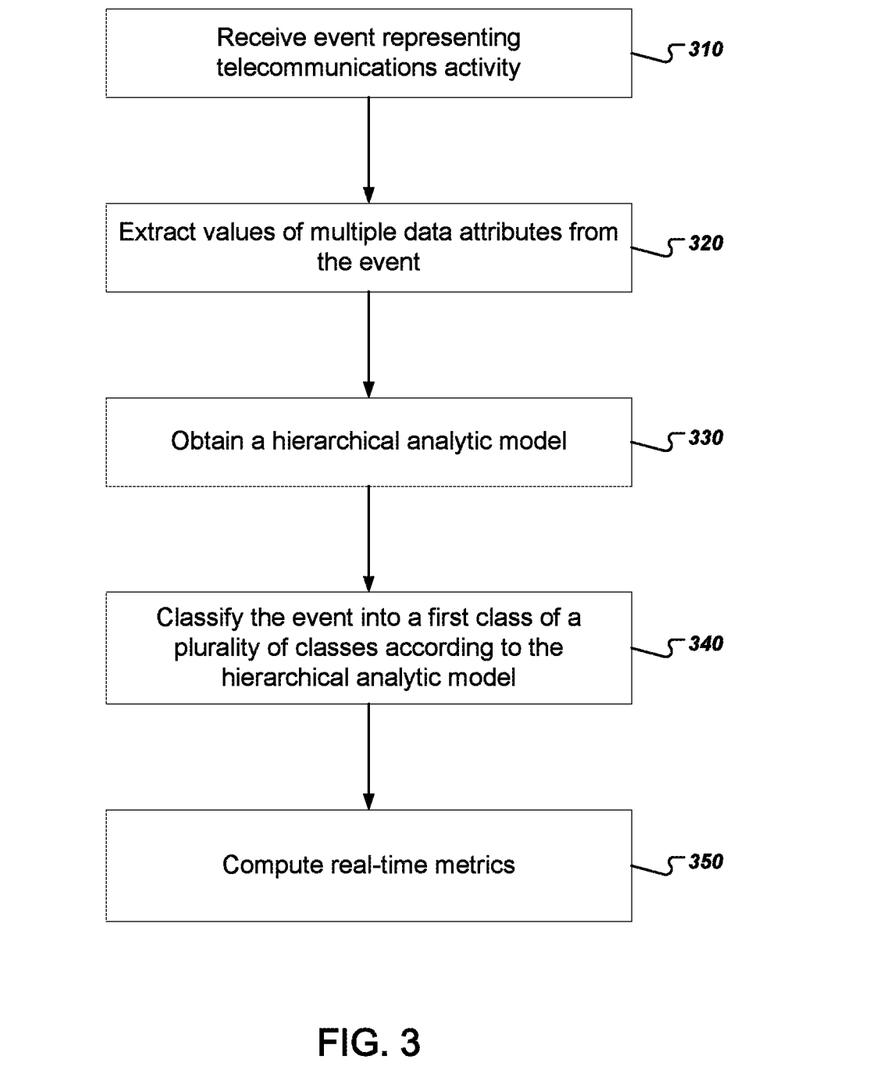
FIG. 3 is a flow chart of an example process for computing metrics using classified events.

FIG. 3 is a flow chart of an example process for computing metrics using classified events. In general, a system receives an event, extracts values of data attributes of the event, and classifies the event according to criteria defined by a hierarchical analytic model. The process can be implemented by one or more computer programs installed on one or more computers. The process will be described as being performed by a system of one or more computers, e.g. the stream computing system 230 of FIG. 2.

The system receives an event representing telecommunications activity (310) In general, the event includes one or more data attributes whose values represent status codes generated by telecommunications protocols. The event can include any number of appropriate data attributes for multiple levels of a particular protocol stack.

The event also typically has a context, which includes metadata associated with the event. For example, the context can include information about a user associated with the event. For example, the metadata can include an international mobile subscriber identity (IMSI) number, a mobile subscriber integrated services digital network (MSISDN) number, an international mobile subscriber identity software version (IMSI(SV)) number, a mobile country code (MCC), or a mobile network code (MNC), to name just a few examples.

The context can also include information about when the event occurred, e.g., an event start time and an event end time. The context can also include information about where the event occurred, e.g., a cell ID (CID) of a base transceiver station or a sector of a base transceiver station identified by a location area code (LAC) or a service area code (SAC).

The context can also include information about the target of the event, e.g., the digits of a telephone number.

The system extracts values of multiple data attributes from the event (320). For example, for 2G SMS communications, the system can extract the values of base station system mobile application part (BSS MAP) messages, direct transfer application part (DTAP) radio resource (DTAP RR) messages, DTAP call control (DTAP CC) messages, and DTAP mobility management (DTAP MM) messages.

For 3G SMS communications, the system can extract a transaction type, a signaling connection control part (SCCP) access link control application part (ALCAP) cause, a radio access network application part (RANAP) cause, a CC cause, a MM cause, and a paging cause.

The system obtains a hierarchical analytic model (330). In general, a hierarchical analytic model defines one or more sets of attribute-specific and class-specific criteria. Each set of criteria applies to a value of a data attribute of an event. The model also specifies an order in which each set of criteria is to be applied to the values of the data attributes. Each set of criteria is associated with a class; an event that satisfies the criteria of a set of criteria can be classified as belonging to the class.

In addition, the model classifies an event at the earliest opportunity. In other words, as soon as one set of criteria is satisfied for a particular event, the system classifies the event and disregards the other sets of criteria. Thus, the hierarchical analytic model is well suited for a stream computing system because events can be quickly and efficiently classified.

The system classifies the event into a first class of a plurality of classes according to the hierarchical analytic model (340). As described above, to be used for computing real-time metrics, the model typically defines a small number of classes, including user failure, network failure, and success.

The system computes real-time metrics (350). After classifying events into particular classes, the system can use the classifications to compute real-time metrics that are based on those classifications.

In some implementations, real-time metrics are aggregated values computed from event classifications received over a particular time period, e.g., the previous second, minute, hour, day, or week. The system can then automatically recompute the metrics after the relevant time period has expired. In this way, the system can continually update the relevant metrics to provide a real-time view into the status of the system.

For example, the system can compute a metrics that include a count of user failures, a count of network failures, a count of total failures, a failure ratio, and a success ratio.

In some implementations, the system filters the events to consider only events having particular values. For example, a system can extract a mobile terminated SMS (MT SMS) or mobile originated SMS (MO SMS) status bit and compute real-time metrics only for events having a MT SMS or MO SMS status hit set.

The system can also generate context-specific metrics, e.g., ureal-time metrics for events that originate in a same geographic area as defined by location area codes. The system can first filter the events by one or more particular context criteria to generate a filtered stream of events having contexts that satisfy the context criteria. For example, the system can include a logical computing node that filters events by a particular context criteria and generates a filtered stream of events. The system can then compute real-time metrics for the filtered stream of events.

The system can also compute cross-stream metrics using classified events from two different streams. For example, a system can compute cross-stream metrics for events received from 2G and 3G event streams. For 2G and 3G event streams, the system can compute cross stream-metrics that include a count of 2G and 3G user failures, a count of 2G and 3G network failures, a count of total 2G and 3G user and network failures, a combined failure ratio, and a combined success ratio, to name just a few examples.

The system can also compute cross-stream metrics for events that satisfy one or more context criteria. For example, the system can filter events in both the 2G and 3G event streams by one or more digits of a user or destination phone number and compute cross stream metrics for the remaining events.

When computing cross-stream metrics, there is typically no guarantee that the streams will be synchronized or will be arriving at the same data rate. Thus, to compute cross stream metrics, in some implementations the system collects events in a buffering window to match co-related events and applies a correction factor to adjust for clock skew and late arrival.

The system can maintain a fuzzy tolerance to out-of-sequence delivery by maintaining dynamically adaptable past and future windows, the size of which can be commensurate with the data rates of the respective event streams. These windows are then subject to probabilistic aggregation to calculate cross-stream metrics.

A co-relation between two event streams f and g can be given by a function of the time lag applied to one of the events streams. If f and g are modeled as discrete unbounded streams, the co-relation can be given by:

$$(f*g)[t] \stackrel{def}{=} \sum_{m=-\infty}^{m=\infty} f^*[m] \times g[m+t],$$

and an estimate of the time delay $T_{delay}$ between the signal streams can be given by:

$$T_{delay} = \underset{t}{\operatorname{argmax}}((f*g)(t)).$$

Figure 4:
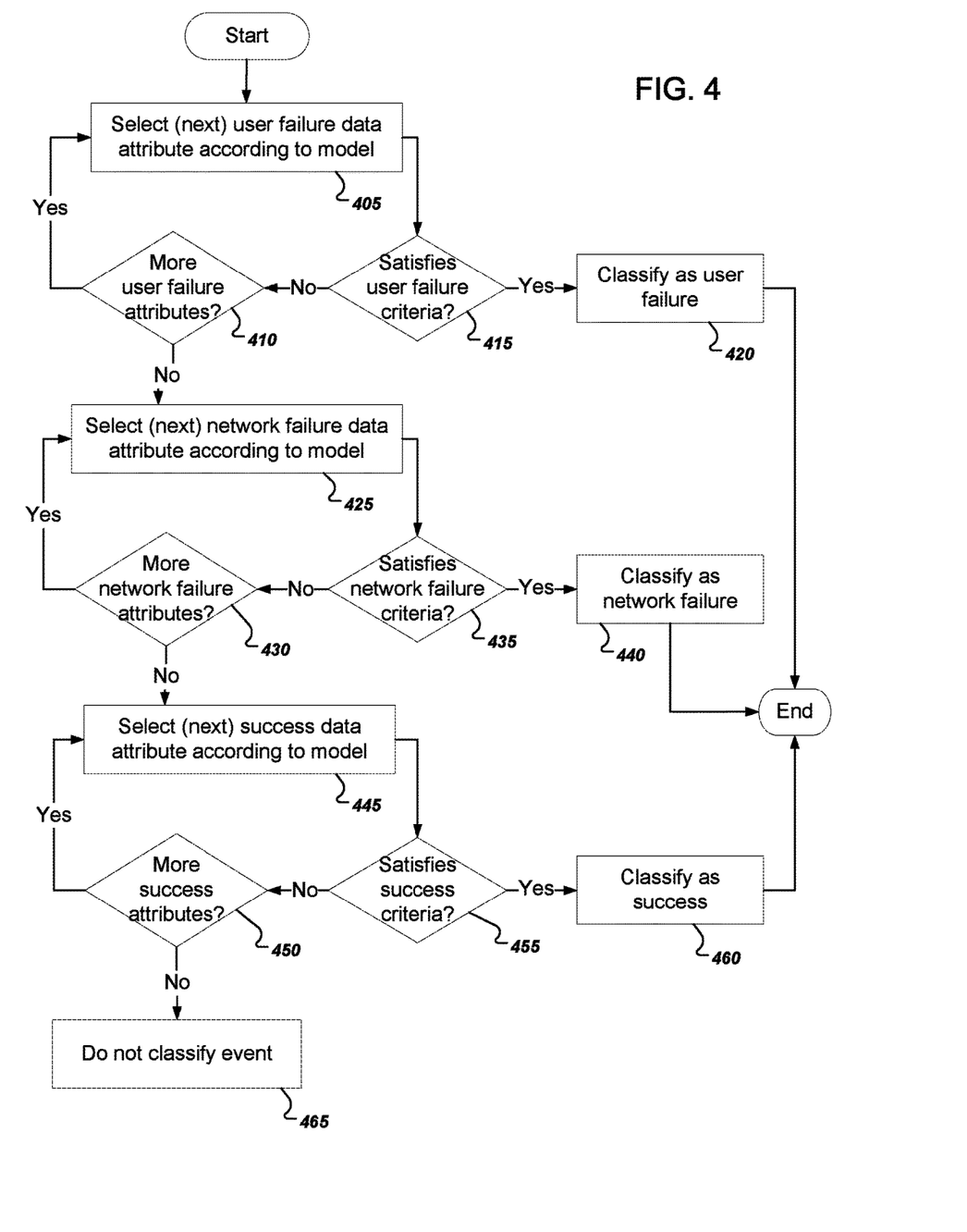
FIG. 4 is a flow chart of an example process for classifying an event according to a hierarchical analytic model.

FIG. 4 is a flow chart of an example process for classifying an event according to a hierarchical analytic model. In general, a system receives an event and applies one or more sets of criteria to the values of one or more data attributes of the event in an order according to the hierarchical analytic model. The process can be implemented by one or more computer programs installed on one or more computers. The process will be described as being performed by a system of one or more computers, e.g. the stream computing system 230 of FIG. 2.

The system selects a user failure data attribute according to a model for classifying events as user failures (405). The model can use different user failure criteria that are specific to each of one or more data attributes. For example, a first user failure data attribute can be a BSS MAP cause of a 2G event.

The system determines whether the value of the data attribute satisfies one or more user failure criteria (415). For example, in some implementations the system uses a 2G analytic model that determines whether a 2G event has a "BSS MAP cause" data attribute having a value of Class 3 or Class 4.

The criteria of the hierarchical analytic models are both attribute-specific and class-specific. In other words, other data attributes will be evaluated using other criteria, and the same data attribute will also be evaluated using different criteria when evaluated for a different class, e.g., a network failure class.

If the value of the data attribute satisfies the one or more user failure criteria, the system classifies the event as a user failure (branch to 420) and the process ends. In other words, the analytic model is designed such that as soon as the system determines that one set of criteria is satisfied, the system does not consider the values of other data attributes of the event.

If the value of the data attribute does not satisfy the one or more user failure criteria, the system determines whether the model has more user failure attributes (branch to 410). If so, the system selects the next user failure attribute according to the model (branch to 405). For example, the next data attribute may be a DTAP RR cause message. The system will then apply other attribute-specific and class-specific criteria to the value of DTAP RR cause according to the model to determine whether to classify the event as a user failure.

If no more user failure attributes remain to be evaluated, the system next evaluates one or more data attributes for a next class according to the model by selecting a next network failure data attribute according to the model (branch to 425). In some implementations, the system evaluates the same set of data attributes for each event class. However, the system can also evaluate a different set of data attributes for each event class.

Furthermore, the model can specify a different class-specific order for each data attribute. In other words, the system need not evaluate data attributes for each class in the same order.

The system determines whether the value of the data attribute satisfies one or more network failure criteria (435). For example, the system can determine whether the BSS MAP cause has a value of Class 2, 5, 6, or 7.

If so, the system classifies the event as a network failure (branch to 440) and the process ends.

If the value of the data attribute does not satisfy the one or more network failure criteria, the system determines whether more network failure data attributes remain (branch to 430). If so, the system selects the next network failure attribute according to the model (branch to 425).

If no more network failure attributes remain to be evaluated, the system next evaluates one or more data attributes for success criteria by selecting a next success data attribute according to the model (branch to 445).

The system determines whether the value of the data attribute satisfies one or more success criteria (branch to 455). For example, the system can determine whether the BSS MAP Cause has a value of Class 0 or 1.

If so, the system classifies the event as a success (branch to 460) and the process ends.

If the value of the data attribute does not satisfy the one or more success criteria, the system determines whether more success data attributes remain (branch to 450). If so, the system selects the next success attribute according to the model (branch to 445). If no more success attributes remain, the system optionally does not classify the event (465). For example, the system can disregard the event without using it to compute metrics.

Table 1 includes attribute-specific and class-specific criteria for an example model for a 2G voice control plane. Table 1 has criteria for three event classes: user failure, network failure, and success. Table 1 also includes class-specific sets of criteria for four data attributes of a 2G voice control plane event, BSS MAP Cause, DTAP RR Cause, DTAP CC Cause, and DTAP MM Cause.

The order in Table 1 of data attributes and the sets of class-specific criteria for each data attribute of the model represent the order in which a system would evaluate the event classes as well as the order in which the system would evaluate data attributes within each class.

TABLE 1

User Failure:
    BSS MAP Cause: (Class 3,4)
    DTAP RR Cause : $\forall_x \in X$ (65)
    DTAP CC Cause : $\forall_x \in X$(1, 3, 6, 8, 16-19, 21-22, 24-31, 87-88, 91)
    DTAP MM Cause : $\forall_x \in X$(2-6, 11-13, 15, 25)
Network Failure:
    BSS MAP Cause: (Class 2,5,6,7)
    DTAP RR Cause : $\forall_x \in X$(1-6, 8-12, 95-101, 111)
    DTAP CC Cause : $\forall_x \in X$( 34, 38, 41-44, 47, 49, 50, 55, 57-58, 63, 65, 68-70, 79, 81, 95-102, 111, 127)
    DTAP MM Cause : $\forall_x \in X$ (17,20 - 23,32 - 34,95 - 101,111)
Success:
    BSS MAP Cause : (Class 0,1)
    DTAP RR Cause : $\forall_x \in X$ (65)
    DTAP CC Cause : $\forall_x \notin X$ (UF ∪ NF)
    DTAP MM Cause : $\forall_x \notin X$ (UF ∪ NF)

The notation $\forall_x \notin X(UF \cup NF)$ means that no values of the corresponding data attribute satisfied the criteria for a user failure or a network failure. The notation $\forall_x \in X(65)$ means that all values of the data attribute had a value of 65. The notation $\forall_x \in X(2\text{-}6, 11\text{-}13, 15, 25)$ means that all values of the data attribute had a value that was between 2 and 6, between 11 and 13, 15, or 25.

Table 2 includes attribute-specific and class-specific criteria for an example model for a 3G voice control plane.

TABLE 2

User Failure:
    RANAP Cause:
        Radio Network Layer Cause: $\forall_x \in X$(12-13, 16, 18-20, 33-34, 21, 35-36, 22-27, 30, 38-39, 42, 50, 58-59)
        Transport Layer Cause: $\forall_x \in$ null
        NAS Cause: $\forall_x \notin X$ (81 - 82,84 - 96)
        Protocol Cause: $\forall_x \in$ {empty set}
        Miscellaneous Cause: $\forall_x \in$ null
        Non Standard Cause: $\forall_x \in$ null
        Radio Network Layer Extension Cause: $\forall_x \in X$(257-261, 269)
    CC Cause: $\forall_x \in X$(1, 3, 6, 8, 16-19, 21-22, 24-31, 87-88, 91)
    MM Cause: $\forall_x \in X$(2-6, 11-13, 15, 25)
    SMS CP Cause: $\forall_x \in X$(81, 95-96)
    SMS RP Cause: $\forall_x \in X$(1, 8, 10, 21, 27-30, 50, 81)
Network Failure:
    RANAP Cause:
        Radio Network Layer Cause: $\forall_x \in X$(8-9, 14-15, 28-29, 31-32, 37, 41-49, 51-57, 61-64)
        Transport Layer Cause: $\forall_x \in X$(65-80)
        NAS Cause: $\forall_x \notin X$ (81 - 82,84 - 96)
        Protocol Cause: $\forall_x \in X$(97-112)
        Miscellaneous Cause: $\forall_x \in X$(113-128)
        Non Standard Cause: $\forall_x \in X$(129-256)
        Radio Network Layer Extension Cause: $\forall_x \in X$(262-266, 270-512)
    CC Cause: $\forall_x \in X$(34, 38, 41-44, 47, 49, 50, 55, 57-58, 63, 65, 68-70, 79, 81, 95-102, 111, 127)
    MM Cause: $\forall_x \in X$(17, 20-23, 32-34, 95-101, 111)
    SMS CP Cause: $\forall_x \in X$(97-111)
    SMS RP Cause: $\forall_x \in X$(11, 22, 38-47, 69, 95-127)
Success:
    RANAP Cause:
        Radio Network Layer Cause: $\forall_x \in X$(2-7, 10-11, 17, 40, 60)
        Transport Layer Cause: $\forall_x \notin X$ (UF ∪ NF)
        NAS Cause: $\forall_x \notin X$ (83)
        Protocol Cause: $\forall_x \notin X$ (UF ∪ NF)
        Miscellaneous Cause: $\forall_x \notin X$ (UF ∪ NF)
        Non Standard Cause: $\forall_x \notin X$ (UF ∪ NF)
        Radio Network Layer Extension Cause: $\forall_x \in X$(2-7, 10-11, 17, 40, 60)
    CC Cause: $\forall_x \notin X$ (UF ∪ NF)
    MM Cause: $\forall_x \notin X$ (UF ∪ NF)
    SMS CP Cause: $\forall_x \notin X$ (UF ∪ NF)
    SMS RP Cause: $\forall_x \notin X$ (UF ∪ NF)

Although the example process in FIG. 4 illustrates a system iterating first over data attributes within a class before moving on to the next class, a system can also iterate over classes for each data attribute before moving on to the next data attribute. In other words, the model may specify different inner and outer loops for evaluation. In addition, the model need not specify any looping control structure. Rather, the model can simply specify a particular order of attribute-specific and class-specific criteria to be applied to the values of one or more data attributes in an order, assigning a particular event class when the one or more criteria are satisfied.

Figure 5:
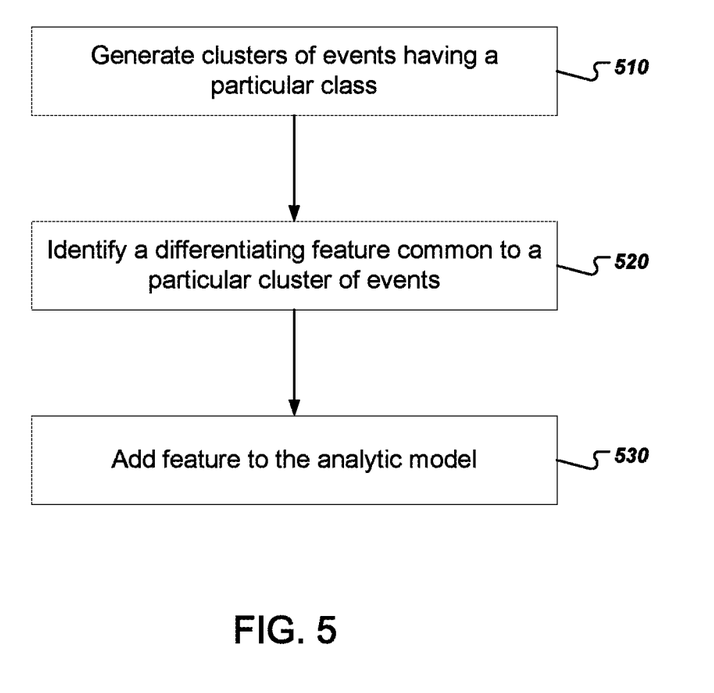
FIG. 5 is a flow chart of an example process for incorporating new features into analytic models.

FIG. 5 is a flow chart of an example process for incorporating new features into analytic models. In general, a system can cluster events classified into a particular class in order to identify common differentiating features. The process can be implemented by one or more computer programs installed on one or more computers. The process will be described as being performed by a system of one or more computers.

The system generates clusters of events having a particular class (510). For example, the system can generate a feature vector for each event using the values of data attributes of the event as features. The system can then perform an appropriate clustering algorithm, e.g., k-means, to generate clusters of events having the particular class.

The system identifies a differentiating feature common to a particular cluster of events (520). For example, the system can determine that user failure events often have a feature indicating that users have incorrect short message service center (SMSC) settings.

The system adds the feature to the analytic model (530). If the differentiating quality of the common feature is strong enough, the system can update the analytic model by adding the differentiating feature to the criteria for failures of the particular class. For example, the system can add SMSC settings as a data attribute to an analytic model as well as one or more criteria for the new data attribute. The system can then evaluate the added data attribute in future events of incoming streams.

Thus, the system can use real-time classification and metrics for rapid updating of the analytic models.

Figure 6:
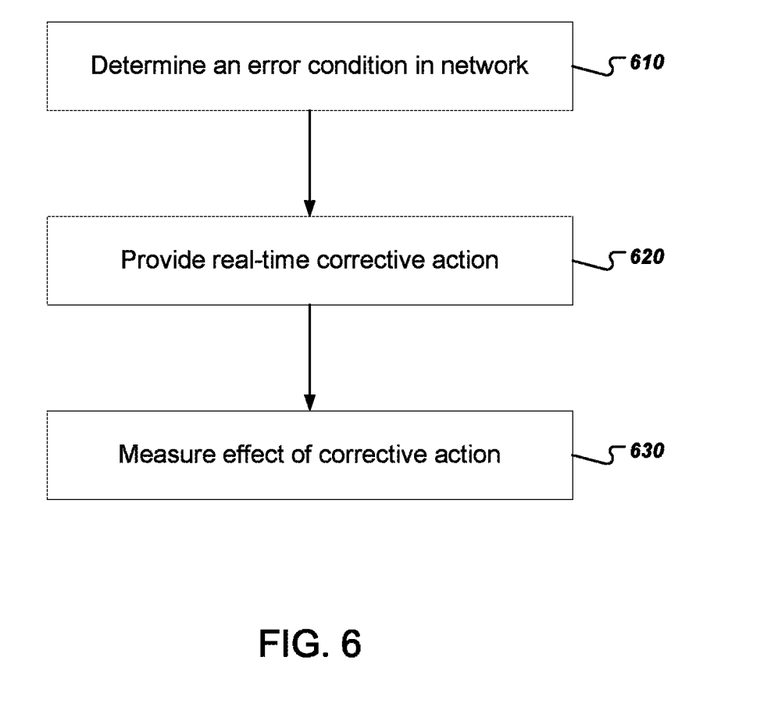
FIG. 6 is a flow chart of an example process for providing a real-time corrective action to users in a network.

FIG. 6 is a flow chart of an example process for providing a real-time corrective action to users in a network. If the real-time metrics computed by the system indicate that a particular class of failures, e.g., user failures, is occurring frequently, the system can provide a corrective action to user devices in the network. The process can be implemented by one or more computer programs installed on one or more computers. The process will be described as being performed by a system of one or more computers.

The system determines an error condition in the network (610). The system can use any appropriate threshold for determining that a particular subpopulation of users in the network or in a particular geographic area are experiencing a particular failure of some kind, e.g., user failures or network failures.

The system provides a corrective action to user devices in the network (620). The corrective action can include providing information intended to be read and understood by a user. For example, the system can provide an SMS message to a user indicating that the user should change a particular setting.

The system measures the effect of the corrective action (630). The system can compare measures of user failures or network failures in the system both before and after providing the corrective action. the effect of the corrective action was unsatisfactory, a user of the system can reevaluate the problem and design a new corrective action for that particular error condition.

The system can consider the measures of user or network failures before and after the correction action as discrete probability distributes P=($p_1$, . . . , $p_k$) and Q=($q_1$, . . . , $q_k$). The system can then compute a measure of the effectiveness of the corrective action according to the Helligner distance H(P, Q) between the classifications:

$$H(P, Q) = \frac{1}{\sqrt{2}} \sqrt{\sum_{i=1}^{k} (\sqrt{p_i} - \sqrt{q_i})^2}.$$

If H(P, Q) satisfies a particular threshold, the system can determine that the corrective action was responsible for the causing the change. The system can also compute a measure of the effectiveness of the corrective action using any appropriate statistical distance measure, including the f-divergence, the Bhattacharyya distance, or the Jensen-Shannon distance, to name just a few examples.

The system can thus use real-time classification and metrics for rapidly responding to issues that arise in the system and for rapidly addressing the issues as they arise.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a modu(e, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display)

monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining a plurality of data objects that each include data corresponding to a respective event that has been classified into a particular event class using a hierarchical analytical model that defines one or more sets of attribute-specific criteria, wherein each data object (i) represents a unit of activity, and (ii) is associated with one or more attributes;
   generating a plurality of event clusters of the data objects that have been classified into the particular class based on features derived from values of the one or more attributes that are associated with each respective data object;
   identifying, for at least one of the generated event clusters, a differentiating feature that is (i) common to the clustered data objects in one cluster and (ii) not common to the clustered data objects in any of the other clusters; and
   updating the hierarchical model, wherein updating the hierarchical model includes adding the differentiating feature and a set of one or more criteria for the differentiating feature to the hierarchical analytical model to classify incoming events.

2. The method of claim 1, wherein generating the plurality of event clusters further comprises:
   for each data object of the plurality of data objects:
      generating a feature vector that represents the data object using the values of the one or more attributes of the data object as features; and
      clustering the generated feature vectors based on the features of the generated feature vectors, wherein each of the clusters of the generated feature vectors represents a particular type of event.

3. The method of claim 1, wherein generating the plurality of event clusters further comprises:
   for each data object of the plurality of data objects:
      generating a feature vector that represents the data object using the values of the one or more attributes of the data object as features; and
      clustering the generated feature vectors based on the features of the generated feature vectors;
   wherein the method further comprises:
   evaluating a differentiating quality of the differentiating feature;
   determining that the differentiating quality of the feature that is common to the clustered data objects satisfies a predetermined threshold; and
   in response to determining that the differentiating quality of the feature that is common to the clustered data objects satisfies a predetermined threshold, adding the feature to the analytical model.

4. The method of claim 1, further comprising:
   obtaining data representing respective values of one or more data attributes of an event in a stream of events; and
   classifying the event using the updated hierarchical model by determining that at least one of the respective values of the one or more data attributes of the event in the stream of events satisfies the set of criteria based on the differentiating feature.

5. A system comprising:
   one or more computers and one or more storage devices storing instructions that are operable, when executed by the one or more computers, to cause the one or more computers to perform operations comprising:

obtaining a plurality of data objects that each include data corresponding to a respective event that has been classified into a particular event class using a hierarchical analytical model that defines one or more sets of attribute-specific criteria, wherein each data object (i) represents a unit of activity, and (ii) is associated with one or more attributes;

generating a plurality of event clusters of the data objects that have been classified into the particular class based on features derived from values of the one or more attributes that are associated with each respective data object;

identifying, for at least one of the generated event clusters, a differentiating feature that is (i) common to the clustered data objects in one cluster and (ii) not common to the clustered data objects in any of the other clusters; and updating the hierarchical model, wherein updating the hierarchical model includes adding the differentiating feature and a set of one or more criteria for the differentiating feature to the hierarchical analytical model to classify incoming events.

6. The system of claim 5, wherein generating the plurality of event clusters further comprises:

for each data object of the plurality of data objects:
generating a feature vector that represents the data object using the values of the one or more attributes of the data object as features; and
clustering the generated feature vectors based on the features of the generated feature vectors, wherein each of the clusters of the generated feature vectors represents a particular type of event.

7. The system of claim 5, wherein generating the plurality of event clusters further comprises:

for each data object of the plurality of data objects:
generating a feature vector that represents the data object using the values of the one or more attributes of the data object as features; and
clustering the generated feature vectors based on the features of the generated feature vectors;

wherein the operations further comprise:
evaluating a differentiating quality of the differentiating feature;
determining that the differentiating quality of the feature that is common to the clustered data objects satisfies a predetermined threshold; and
in response to determining that the differentiating quality of the feature that is common to the clustered data objects satisfies a predetermined threshold, adding the feature to the analytical model.

8. The system of claim 5, the operations further comprising:

obtaining data representing respective values of one or more data attributes of an event in a stream of events; and
classifying the event using the updated hierarchical model by determining that at least one of the respective values of the one or more data attributes of the event in the stream of events satisfies the set of criteria based on the differentiating feature.

9. A non-transitory computer-readable medium storing software comprising instructions executable by one or more computers which, upon such execution, cause the one or more computers to perform operations comprising:

obtaining a plurality of data objects that each include data corresponding to a respective event that has been classified into a particular event class using a hierarchical analytical model that defines one or more sets of attribute-specific criteria, wherein each data object (i) represents a unit of activity, and (ii) is associated with one or more attributes;

generating a plurality of event clusters of the data objects that have been classified into the particular class based on features derived from values of the one or more attributes that are associated with each respective data object;

identifying, for at least one of the generated event clusters, a differentiating feature that is (i) common to the clustered data objects in one cluster and (ii) not common to the clustered data objects in any of the other clusters; and updating the hierarchical model, wherein updating the hierarchical model includes adding the differentiating feature and a set of one or more criteria for the differentiating feature to the hierarchical analytical model to classify incoming events.

10. The computer-readable medium of claim 9, wherein generating the plurality of event clusters further comprises:

for each data object of the plurality of data objects:
generating a feature vector that represents the data object using the values of the one or more attributes of the data object as features; and
clustering the generated feature vectors based on the features of the generated feature vectors, wherein each of the clusters of the generated feature vectors represents a particular type of event.

11. The computer-readable medium of claim 9, wherein generating the plurality of event clusters further comprises:

for each data object of the plurality of data objects:
generating a feature vector that represents the data object using the values of the one or more attributes of the data object as features; and
clustering the generated feature vectors based on the features of the generated feature vectors;

wherein the operations further comprising:
evaluating a differentiating quality of the differentiating feature;
determining that the differentiating quality of the feature that is common to the clustered data objects satisfies a predetermined threshold; and
in response to determining that the differentiating quality of the feature that is common to the clustered data objects satisfies a predetermined threshold, adding the feature to the analytical model.

12. The computer-readable medium of claim 9, the operations further comprising:

obtaining data representing respective values of one or more data attributes of an event in a stream of events; and
classifying the event using the updated hierarchical model by determining that at least one of the respective values of the one or more data attributes of the event in the stream of events satisfies the set of criteria based on the differentiating feature.

* * * * *